UNITED STATES PATENT OFFICE.

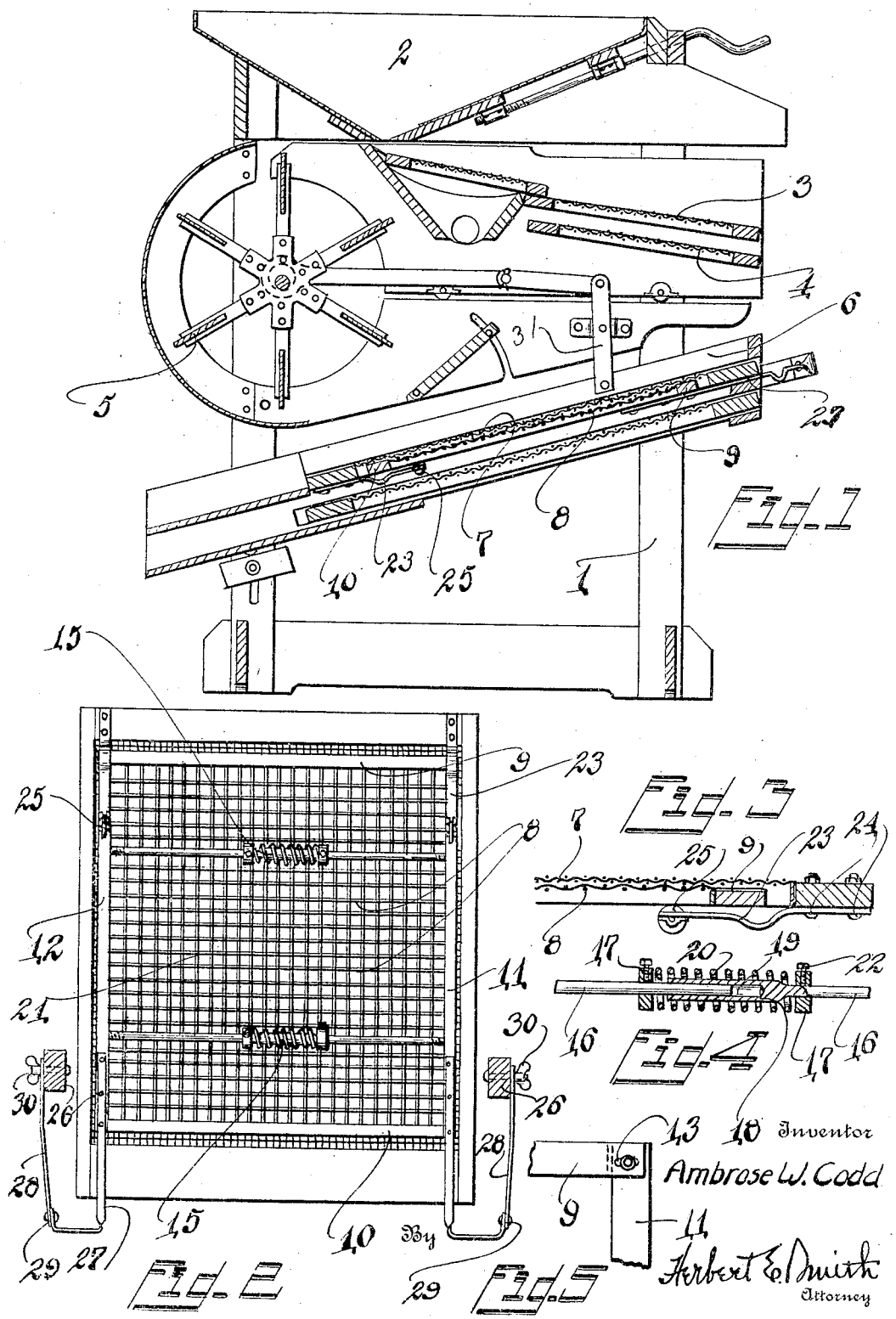

AMBROSE W. CODD, OF SPOKANE, WASHINGTON.

SEED-GRADER.

1,238,267.      Specification of Letters Patent.      Patented Aug. 28, 1917.

Application filed December 11, 1916. Serial No. 136,270.

*To all whom it may concern:*

Be it known that I, AMBROSE W. CODD, a citizen of the United States, residing at Spokane, in the county of Spokane and State of Washington, have invented certain new and useful Improvements in Seed-Graders of which the following is a specification.

My invention relates to improvements in seed graders of the so-called reciprocating type.

The conventional seed grader is composed of sloping screens or sieves of one form or another which are supported below the entrance of the seed or grain and which reciprocate to allow the small seed to pass through the meshes of the screen and the larger seed to pass out of the tail or lowermost end of the screen. Such screens or sieves used in grading are subject to considerable weight imposed by the bulk of the grain or seed disposed thereon and as it is an advantage to have as much screen area as possible, it is often necessary that the sieves be composed of very fine wire which are necessarily limited in strength and supporting capacity which often causes sagging, resulting in deposing most of the seed and focusing most of the work upon the sagged portion or central portion of the screen, which soon wears out causing replacement and at all times faulty grading.

A further difficulty arises in handling seed grains, especially those types that are elongated and tapered from the ends, which frequently enter the openings of the sieve or screen, and because of the size, can not pass through but remain stuck there to clog the screen. This causes stoppage of the screen and loss of efficiency in grading and causes a certain amount of smaller material being graded to pass off with the larger grain and cause imperfect grading and separation.

The principal object of the present invention is to provide, in connection with the usual reciprocating sieve or screen, a second screen placed directly below and in contact with the underside of the sieve or screen and mounted stationary with respect to the machine so that when the reciprocating screen is operated the lower screen will serve to clear the meshes of the reciprocating screen of such seed as may be stuck therein.

A further object of equal importance resides in the provision of a stationary woven wire screen supported directly under the reciprocating screen and providing tensioning means to attune this coarse wire screen so that each cross wire of said stationary screen shall be under tension and bear directly against the reciprocating screen, in such a manner that as the upper screen is reciprocated any kernels or seeds that may be caught in the meshes will be popped out and allowed to pass off the tail of the screen.

A still further object of my invention consists in providing a stationary screen disposed directly beneath and in contact with the underside of the reciprocating screen of a seed grader and provided to support the reciprocating screen from sagging and causing the grain to be disposed over a small area of the screen by reason of such sagging.

Broadly, my improvement on seed graders comprises a stationary screen of woven wire of large mesh mounted upon a suitable frame and of sufficient size to be retained within the frame, of a reciprocating screen in such a manner that my screen will be in contact at all times with the entire area of the grading screen and in which the frame of my improved screen is subject to expansion laterally to automatically maintain tension upon the screen for the purpose of keeping the reciprocating screen clean, and in addition for supporting a portion of the weight disposed upon said reciprocating screen.

Minor details and features of construction will be hereinafter more fully pointed out and described, recourse being had to the accompanying drawings, in which—

Figure 1 is a vertical cross section through the usual type of seed graders and cleaners.

Fig. 2 is a view of the underside of my improved screen showing the construction thereof, with means of attachment to the underside of the reciprocating screen.

Fig. 3 is a cross section through the lowermost end of my improved screen.

Fig. 4 is a cross section through the tensioning devices of my screen.

Fig. 5 is a fragmentary view showing one corner of my improved screen frame construction and showing the manner of supporting the expansible side members with the end members of my screen.

Referring more specifically to the drawings in which like reference characters indicate like parts in the several views, the numeral 1 designates a seed grader frame supporting the usual hopper 2, screens 3 and 4, and fan 5. At 6 is disposed the reciprocating frame which supports the reciprocating screen 7, which screen is the main separating screen to which I apply the screen 8 of my construction. This screen 8 consists of end rails 9 and 10 and side rails 11 and 12, and the ends and side rails are attached in the manner shown in Fig. 5 in which the end rail 9 is dove-tailed and provided with a slot 13 through which the pin 14 attached to the rail 11 is free to work, but at the same time acts to support the two parts together within the limits of the adjustment of the slot 13. Intermediate the ends 9 and 10 of the screen, are positioned tensioning members 15, consisting of rods 16 substantially supported to the rails 11 and 12 and provided with collars 17 and an enlarged portion 18 on the end of one rod which is bored at 19 to receive the end of the opposite rod 16. Over this enlarged portion 18 and between the collars 17 is a spring member 20 which, when placed under compression, will serve to extend the side rods 11 and 12 to keep the screen fabric 21 taut and under a lateral strain.

The collars 17 are provided with adjusting screws 22 by which means tension may be placed upon the screen to provide more or less tension upon the sieve or screen fabric 21. This frame is supported directly under the seed grader reciprocating sieve 7 in such a manner that the wires or mesh 21 will contact with the underside of 7 and have frictional engagement therewith over the entire area.

It is the purpose of my invention to maintain my screen stationary and to accomplish this purpose I support the lowermost end of my screen by means of a spring member 23 attached at 24 to the reciprocating screen frame and provided, at its point of engagement with my screen 8, with a roller 25 for the purpose of maintaining the screens 7 and 8 in close contact at the lowermost end. The elevated end of the screen, 8 is supported rigidly to the leg members 26 of the frame 1 by means of straps 27 attached to the side bars 11 and 12 in any suitable manner. The straps 27 have pivotal connection with an adjustable supporting arm 28 at 29, and the supporting arms 28 are held in position upon the legs 26 by means of the bolt and thumb nut 30. It is very seldom that any adjustment is required of 28, but should the screen 8 be slightly spaced away from the screen 7, then the arm 28 may be adjusted to maintain the two screens in close relation.

Now when the seed grader is operated, reciprocating motion is imparted through the lever 31 to the sifting frame 6 which carries with it the screen 7. By reason of the attachment of my screen 8 to the legs 26 of the frame, it is evident that my screen will remain stationary and that the screen 7 will be reciprocated over the wires of the screen 8 so that any grain that may be stuck in the meshes of the screen 7 will be popped back by reason of engaging with one of the wires of the larger meshed screen 8. As the screen 8 is maintained in a fixed position it will be evident by reference to the drawings, that the supporting member 23, carrying the wheel 25, will cause the two screens to be held in close engagement, but still allow the screen 7 to reciprocate without undue friction engagement with the side rails 11 and 12.

On account of the weight of seed, grain and the like, it will be evident that while there is a necessity of providing a grading screen 7 of fine mesh, which of necessity means fine fiber, it will also be readily seen that by providing a screen of my construction of a coarse mesh and of strong wire, it is possible to provide in addition to a mesh cleaner, a screen supporting surface and by reason of the expansive members 15 provided on my screen, I can at all times maintain a flat surface over which the graded grain or seed may pass and which will provide for a more satisfactory operation and will provide a means whereby the entire sieve surface 7 is available as it is known in practice that in a very short time the grading screens without under support will sag and draw the seed to the center or in the sagged portion, thus rendering only a small area of the screen available for use and rendering the screen much less efficient than intended.

While I have specifically described the elements best adapted to perform the function set forth, it is obvious that various changes in the form proportions and the details of construction may be resorted to without departing from the spirit of the invention as hereinafter claimed, and I want it understood that I distinctly reserve the right to make such changes without waiving the protection sought by this application for patent.

I claim:—

1. In a seed grader, the combination with a reciprocating screen, of a screen of relatively coarse mesh yieldingly supported against the underside of the reciprocating screen and held against longitudinal movement, the coarse screen being held under lateral tension whereby to both clean and support the reciprocating screen.

2. In a seed grader, the combination with a reciprocating screen of comparatively fine mesh and a stationary screen supported against the underside of the reciprocating screen, the stationary screen being of comparatively coarse mesh and held under lateral tension whereby to both clean and support the reciprocating screen.

3. The combination with a reciprocating screen of relatively fine mesh and of a screen of relatively coarse mesh yieldingly supported against the underside of the reciprocating screen and secured against longitudinal movement and provided with lateral tension means whereby to clean and support the reciprocating screen.

4. The combination with a reciprocating screen, of a cleaner screen of comparatively coarse mesh yieldingly supported against the underside of the reciprocating screen and held against longitudinal movement therein and the frame of said coarse cleaner screen being provided with tension means acting to tension the coarse wire screen laterally to support the underside of the reciprocating screen and at the same time to clean said reciprocating screen.

5. The combination with a reciprocating screen, of a cleaner screen yieldingly supported against the underside of the reciprocating screen to clean and support the same and held against longitudinal movement therein, said screen comprising a laterally expanding tension frame supporting a screen of relatively coarse mesh, means on the reciprocating screen for supporting the coarse screen against the underside of the reciprocating screen consisting of yieldingly mounted rollers on one end, and supporting means secured to the opposite ends and engaging the frame to maintain the coarse screen against the underside of the reciprocating screen, said means providing yielding support and provided with means for adjustment.

In testimony whereof I affix my signature.

AMBROSE W. CODD.

Copies of this patent may be obtained for five cents each, by addressing the "Commissioner of Patents. Washington, D. C."